United States Patent
Westerman et al.

[11] Patent Number: 6,157,412
[45] Date of Patent: Dec. 5, 2000

[54] SYSTEM FOR IDENTIFYING VIDEO FIELDS GENERATED FROM FILM SOURCES

[75] Inventors: Larry Alan Westerman, Portland, Oreg.; Prasanna L. Modem, Vancouver, Wash.

[73] Assignee: Sharp Laboratories of America, Inc., Camas, Wash.

[21] Appl. No.: 09/052,711

[22] Filed: Mar. 30, 1998

[51] Int. Cl.[7] .............................. H04N 5/46; H04N 7/01
[52] U.S. Cl. ............................................ 348/558; 348/446
[58] Field of Search .................................. 348/558, 555, 348/446, 448, 443, 97, 449, 459, 911; H04N 5/46, 7/01

[56] References Cited

U.S. PATENT DOCUMENTS

| | | | |
|---|---|---|---|
| 4,876,596 | 10/1989 | Faroudja ................................. | 358/140 |
| 4,881,125 | 11/1989 | Krause .................................... | 358/141 |
| 4,933,759 | 6/1990 | Van der Meer et al. ................ | 358/105 |
| 4,998,287 | 3/1991 | Katznelson et al. ..................... | 382/34 |
| 5,267,035 | 11/1993 | Weckenbrock et al. ................ | 358/105 |
| 5,317,398 | 5/1994 | Casavant et al. ........................ | 348/570 |
| 5,365,280 | 11/1994 | De Haan et al. ........................ | 348/699 |
| 5,398,071 | 3/1995 | Gove et al. .............................. | 348/558 |
| 5,452,011 | 9/1995 | Martin et al. ............................ | 348/526 |
| 5,550,592 | 8/1996 | Markandey et al. .................... | 348/448 |
| 5,563,651 | 10/1996 | Christopher et al. ................... | 348/97 |

*Primary Examiner*—Sherrie Hsia
*Attorney, Agent, or Firm*—Chernoff, Vilhauer, McClung & Stenzel, LLP

[57] ABSTRACT

A detector for a video signal includes a pixel comparator that compares a plurality of values of pixels of a first field of the video signal with corresponding pixels of a second field of the video signal. The second field is a second preceding field of the video signal in relation to the first field. The resultant values from the comparison is a set of pixel difference values. A counter determines a count value representative of the number of the set of pixel difference values that are either greater than a threshold value or less than the threshold value. A thresholder circuit determines a variable statistical value, such as an average, based upon a preceding series of the count values. The thresholder circuit compares the variable statistical value with the count value, or a percentage thereof, to determine whether the variable statistical value is greater than the count value or whether the statistical value is less than the count value. The sequence analyzer determines whether the result of the thresholder circuit follows a recognizable pattern.

32 Claims, 3 Drawing Sheets

SYSTEM FOR IDENTIFYING VIDEO FIELDS GENERATED FROM FILM SOURCES

BACKGROUND OF THE INVENTION

The present invention relates to a system for detecting and sequencing interlaced video signals derived from film having successive image frames.

Typical broadcast television uses frames of interlaced video, each frame consisting of two fields. The first field normally contains the odd numbered lines of the frame and the second field normally contains the even numbered lines of the frame. Typical display systems display the fields sequentially on a cathode-ray tube.

A special problem arises when the interlaced fields originating from movie film are converted to a progressive scan display suitable for high definition television or computer monitors. Movie film is a progressive scan material. Systems operating in accordance with NTSC (broadcast television) typically convert the film source to a 60 hertz interlaced format by using a 3:2 pull down technique, as shown in FIG. 1. Film provides sequential complete image frames, as shown by frame boundaries 12, 14, and 16. The first frame between boundaries 12 and 14 is scanned such that the even numbered lines go to an even field between boundaries 18 and 20, and the odd numbered lines go to an odd field between boundaries 20 and 22.

The even numbered lines scanned from the first frame also go to the even field for frame 2. The odd numbered lines scanned from the second film frame between boundaries 14 and 16 go to the odd field of frame 2. The even numbered lines for the even field of frame 3 come from the second film frame. As shown by this example, this encoding technique is referred to as a 3:2 pull down because every other frame contributes three (3) fields to the interlaced video and the offset frames contribute two (2) fields to the interlaced video.

Being able to determine whether video material is derived from a 3:2 pull down can be advantageously used in subsequent video signal processing systems, such as high definition television receivers or digital video compression systems. For example, motion-compensated picture signal processing methods are potentially very suitable to provide an improved display quality of the picture signal, but artifacts caused by motion vector estimation errors as a result of duplicate identical fields are very disturbing. Consequently, there is a need to determine when motion vectors are reliable enough to allow for a motion-compensated picture signal processing mode. There is also a need to determine when the motion-compensated picture signal processing mode should be switched off in view of the unreliability of the motion vectors.

Faroudja, U.S. Pat. No. 4,876,596, discloses a system for converting a 3:2 interlaced video format to a progressive video format by detecting with a code included in the interlaced video which fields are from the three-segment frame and which fields are from the two-segment frame. The code is read by a processor prior to displaying the video to select the appropriate fields to display. Unfortunately, such an approach requires an explicit specification of the 3:2 pull down by incorporating a code within the video which may not be provided by many encoding systems.

Krause, U.S. Pat. No. 4,881,125, discloses a system for providing a progressive-scan video display signal from an interlaced video signal derived from progressive film. Krause teaches combining the currently received video field and a delayed video field to provide a progressive-scan video frame signal at the video rate, in which alternate lines are derived respectively from odd and even video fields. The technique used by Krause to combine fields is generally referred to as "jamming," which is the putting together of two interlaced fields into a single frame. However, Krause suggests the use of a sync signal transmitted during the vertical blanking interval of a video signal to indicate the beginning of a 3:2 sequence. The sync signal approach requires an explicit specification of the 3:2 pull down which may not be provided by many encoding systems.

Neither Krause nor Faroudja suggest how to determine whether the interlaced video originated from a film source, such as a 24 frames per second material, without a control signal being provided. Moreover, neither Krause nor Faroudja suggest how to determine the sequence of the 3:2 frames without the control signal being provided.

Van der Meer et al., U.S. Pat. No. 4,933,759, disclose a motion detection system based on picture signal value comparisons between picture elements in consecutive interlaced television pictures (n−2, n−1), (n, n+1), (n+2, n+3), motion or no motion, respectively, being determined in dependence on the fact whether comparison results exceed or do not exceed a threshold value. A picture element in a first field of a television picture (first field of the particular frame) is compared with a number of surrounding picture elements in a second subsequent field (second field of the particular frame). A corresponding picture element in the second subsequent field is likewise compared with a number of surrounding picture elements in the first field. Accordingly, Van der Meer et al. teach a system that compares combinations of picture elements within both the same field and between a set of six fields in order to match the fields with the lowest differences as being the repetitive field of the 3:2 pull down for synchronization. However, Van der Meer et al. fail to specifically address the issue of whether or not the interlaced video originated as film. Further, Van der Meer et al. employ a fixed threshold value for the comparisons which may result in inaccurate results if the data has significant amounts of noise. The noise may originate from many sources, for example, transmission noise and noise on the film recording medium.

Katznelson et al., U.S. Pat. No. 4,998,287, disclose a system for determining the synchronization of 3:2 interlaced video by using a total difference of an analog field comparison together with a threshold. The system of Katznelson et al. is also analog based, including buffers and delay lines, which is unsuitable for digital based systems. Katznelson et al. also fail to specifically address the issue of whether or not the interlaced video originated as film.

Casavant et al., U.S. Pat. No. 5,317,398, disclose a 3:2 pull down detector that includes circuitry for generating the differences between corresponding pixel values in two fields, separated by a field, of a video signal. Ignoring noise, any parts of the image which are identical in both fields result in a zero frame difference. These differences are applied to a coring circuit which excises differences having values less than a predetermined amplitude. That is, small frame differences are set to zero. The cored differences are accumulated by an accumulator which sums the magnitudes of the cored difference signal for each field. Accordingly, Casavant et al. produce a single value for each frame that indicates the degree of difference or motion between the current field and the field that occurred two fields prior. Accumulated values for respective frames are compared with a five point average to eliminate spikes between frames. The result is applied to a signal averager and to a correlation circuit. Average values from the averager are subtracted from correlation values from the correlation circuit. A film mode signal is indicated if the latter differences are greater than a predetermined value. As shown in FIG. 4 of Casavant et al., the cored difference being above a threshold value indicates that the source of the video was film based and the timing of the spikes indicates the synchronization of the frames. Unfortunately, the thresholding does not permit the discrimination between film that was originally filmed at either 30 hertz or 24 hertz. Accordingly, additional processing is required to perform such a discrimination. Further, the system taught by Casavant et al. is sensitive to noise.

De Hann et al., U.S. Pat. No. 5,365,280, disclose a method of controlling a picture signal processing mode using motion vectors to determine if the original source was film. Unfortunately, the computation of the motion vectors is computationally intensive and prohibitively expensive for inexpensive real time systems.

Gove et al., U.S. Pat. No. 5,398,071, disclose a film-to-video format detector for a digital television receiver. The detector receives pixel data from a current field and a second preceding field and then calculates a set of pixel difference values. The pixel difference values are added together to obtain a total field difference value. The total difference value is compared against a predetermined threshold value. These steps are repeated to obtain a series of total difference values that are analyzed to determine whether it has a pattern corresponding to a film-to-video format. Unfortunately, the system taught by Gove et al. is sensitive to noise.

What is desired, therefore, is a system for detecting and sequencing video signals derived from film having successive image frames that is insensitive to noise. Further, the system should not be computationally intensive.

SUMMARY OF THE INVENTION

In a first aspect, the present invention overcomes the aforementioned drawbacks of the prior art by providing a detector for a video signal that includes a pixel comparator that compares a plurality of values of pixels of a first field of the video signal with corresponding pixels of a second field of the video signal. The second field is a second preceding field of the video signal in relation to the first field. The resultant values from the comparison is a set of pixel difference values. A counter determines a count value representative of the number of the set of pixel difference values that are either greater than a threshold value or less than the threshold value. A sequence analyzer determines whether the count values follow a recognizable pattern.

The determination of the number of pixel difference values greater than the threshold value provides an intensity independent system with consistent results regardless of whether the images are patterned, bright, or dark. Preferably, the insignificant pixel difference values are set to zero and the significant pixel difference values are set to one. The result is a set of values with a binary representation of 0's and 1's which are easily added and processed with simple electronics.

In another aspect of the present invention the counter determines a current total value representative of either the number of the set of pixel difference values that are greater than the threshold value, the number of the set of pixel difference values that are less than the threshold value, or the summation of a plurality of the set of pixel difference values. Accordingly, the counter may calculate a summation of pixel difference values, if desired. A thresholder circuit determines a variable statistical value, such as an average, based upon a preceding series of the total values. The thresholder circuit compares the variable statistical value with the current total value, or a percentage thereof, to determine whether the variable statistical value is greater than the current total value or whether the statistical value is less than the current total value. The sequence analyzer determines whether the result of the thresholder circuit follows a recognizable pattern.

The total number of changed pixels between frames depends on, in part, changes in illumination, overall motion, and noise. The use of the variable statistical value, which is a value dependent on the past history of the current total value, automatically adjusts for the changes in illumination, overall motion, and noise within a video and between different videos.

The foregoing and other objectives, features, and advantages of the invention will be more readily understood upon consideration of the following detailed description of the invention, taken in conjunction with the accompanying drawings.

DETAILED DESCRIPTION OF THE PREFERRED EMBODIMENT

Figure 1:
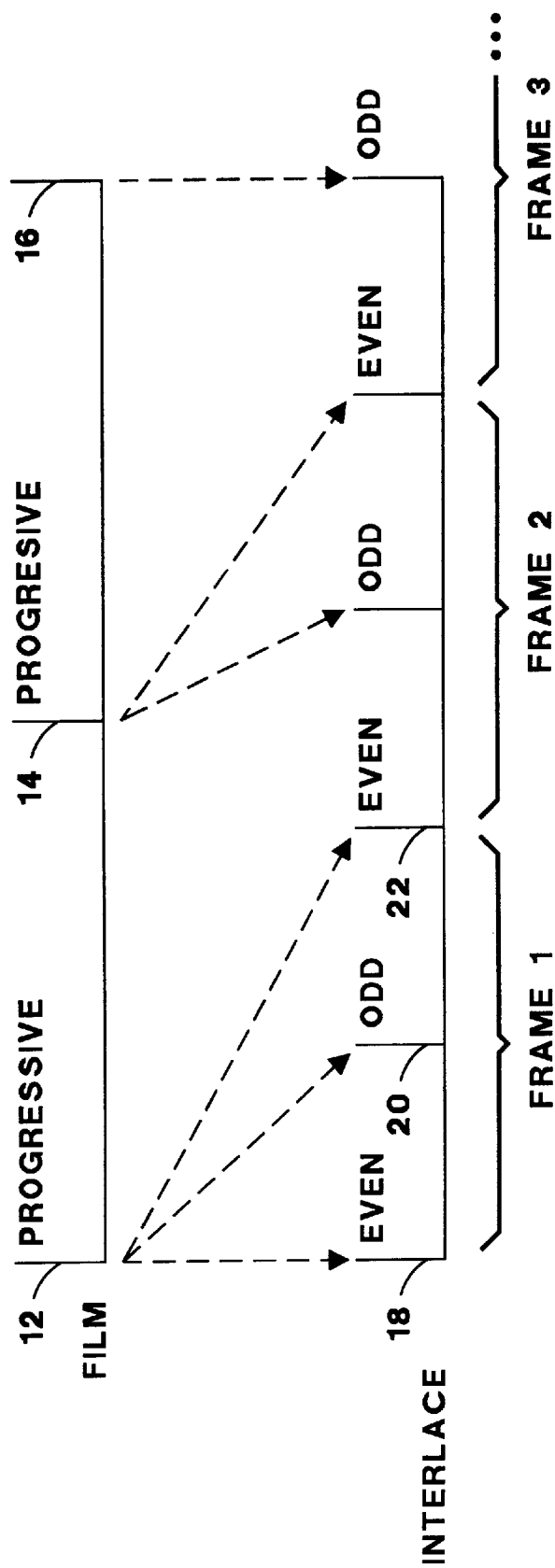
FIG. 1 is an illustration of a 3:2 video format.
Figure 2:
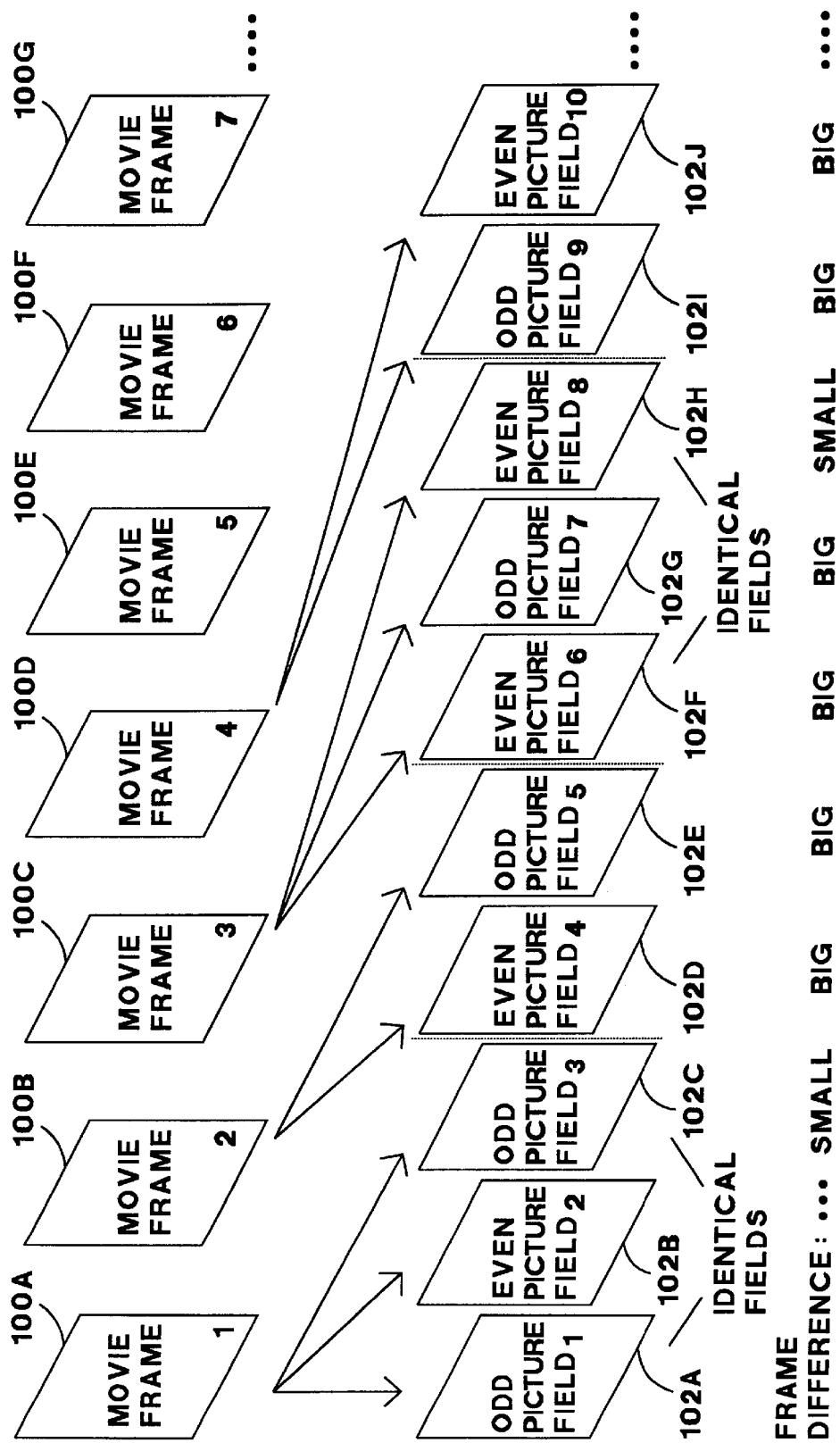
FIG. 2 is an alternative illustration of a 3:2 video format.

Referring to FIG. 2, each movie frame 100a–100g, typically displayed at a rate of 24 frames per second, is converted to a television/video rate of 30 frames per second using a 3:2 pull down method. As shown and previously described, every other movie frame translates into three picture fields each, and the intermediate frames are translated into two picture fields each. The odd lines of movie frame 100a are scanned and result in fields 102a and 102c, while the even lines of movie frame 100a are scanned and result in field 102b. The even lines of movie frame 100b are scanned and result in the field 102d, while the odd lines of movie frame 100b are scanned and result in field 102e. The even lines of movie frame 100c are scanned and result in fields 102f and 102h, while the even lines of movie frame 100c are scanned and result in field 102g. The even lines of movie frame 100d are scanned and result in the field 102i, while the odd lines of movie frame 100d are scanned and result in field 102j.

Figure 3:
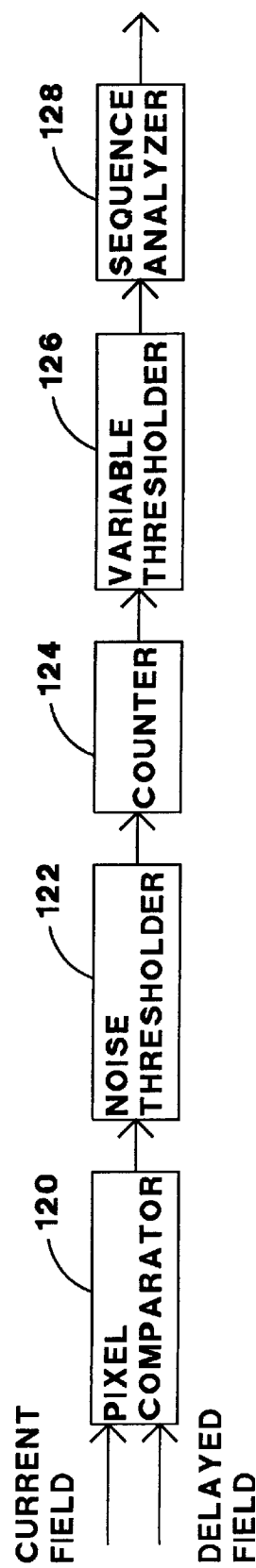
FIG. 3 is a block diagram of an exemplary embodiment of a detector for a 3:2 video format in accordance with the present invention.

Referring also to the detector of FIG. 3, the pixel values of the current field and the pixel values of a second preceding field, such as fields 102a and 102c, are compared by a pixel comparator 120. The pixel comparator 120 calculates the difference between respective pixels of different fields to obtain pixel difference values. Because noise is inherent in such a system, especially as a result of scanning, a noise thresholder 122 compares each resulting pixel difference value from the pixel comparator 120 to a predetermined threshold value. The noise thresholder 122 sets each pixel value to 0 if it is less than the threshold. Setting the pixel difference values to zero (or any suitable value) if they are less than the predetermined threshold reduces the effects of noise being mistaken for image motion or image changes, and insures that only significant differences are forwarded for further processing.

The present inventors came to the realization that the differences between the pixel values of the fields for dim images will inherently be small in comparison to the differences between the pixel values of the fields for bright images. Accordingly, the intensity of the fields will have a significant effect on the magnitude of the pixel values obtained after thresholding by the noise thresholder 122.

For example, a video sequence with a black background and an illuminated face in its center, where only the face changes, will result in a small total difference between compared fields primarily because the black background did not change. Accordingly, in the presence of noise there will only be minor differences between compared repeated fields and compared non-repeated fields. Therefore, the threshold value required for the accumulated frame difference, such as the system taught by Casavant et al., would need to be set relatively low. The result is that the Casavant et al. system would have difficultly determining whether the original source of the video was a movie film.

Another example is a video that has a repetitive pattern, such as vertical stripes one pixel wide of alternating intensity that are similar to one another, such as values of 40 and 41. If the image moves horizontally one pixel then every pixel in the image has in fact changed, but the accumulated frame difference would remain small. As such, in the presence of noise, systems such as Casavant et al. may have difficulty identifying the fields as having changed.

The present inventors, realizing the limitations in the accumulated difference approach taught by Casavant et al., developed an intensity independent system that provides consistent results regardless of whether the images are patterned, bright, or dark. To reduce the intensity dependent characteristics of the pixel differences, the noise thresholder 122 sets each pixel value to 1 if it is greater than or equal to the predetermined threshold. Accordingly, if a sufficient change exists between a pair of compared pixels then the system indicates that such a change occurred by setting the pixel difference value to 1. This reduces the effects of image intensity, and insures that only significant differences are forwarded for further processing. The result of the noise thresholder 122 is a set of values with a binary representation of 0's and 1's. It is to be understood that any other suitable system may be used to indicate those pixels that have a sufficient change between fields.

A counter 124 sums the resultant values (0's and 1's) from the noise thresholder 122. The output from the counter 124 is a value representative of a total count of the number of compared pixels with a sufficient change between fields, as opposed to a total magnitude of pixel differences. It is to be understood that the counter 124 may alternatively count the number of pixels without a sufficient change.

The counter 124 has a predefined maximum output value, such as the total number of pixels in the extreme case, which permits the use of electronics with a small number of bits. In addition, incrementing the counter 124 by one only requires simple electronics as opposed to adding together non-binary numbers such as 200 and 137.

The counter 124 provides a sequence of values over a series of fields. A variable thresholder 126 compares the total from the counter 124 against a base threshold value. The base threshold value is calculated as a percentage of the number of pixels in the field. In the preferred embodiment, the base threshold value is set at half the number of pixels of the field. If the total from the counter 124 is greater than or equal to the base threshold value, then an adaptive luminance count (ALC) threshold value is set to zero. This is indicative of video where the scene has changed. If the total from the counter 124 is less than the base threshold value then the system determines if the video has a 3:2 format. The result of comparing the output of the counter 124 (count) to the base threshold value is to identify scene changes so that they are not confused as 3:2 video and to signal a sequence analyzer 128 to pause a few frames before continuing to determine if the video has a 3:2 format.

In the case where the count is less than the base threshold value, the count is compared to the ALC threshold value for a possible match for a 3:2 video. Initially, the ALC threshold value is set to the value of the count. For subsequent fields the ALC threshold value assumes the form of a leaky integrator [(7*previous threshold+count)/8]. In other words, the ALC threshold value is the running average of the last N fields, such as 8. A match for a 3:2 video is signaled by a drop in the current count to less than a percentage of the ALC threshold value, such as one-half. This sudden drop identifies the small frame difference which is preceded by a sequence of large frame differences in the presence of 3:2 pull down, as shown in FIG. 2. In summary, the variable thresholder 126 compares the output of the counter 124 with the running average of the last N outputs of the counter 124 to identify small field differences. The ALC threshold value may alternatively be any suitable statistical value based on the preceding data, such as a medium or mean.

The output of the variable thresholder 126 is a 1 or 0 depending on the comparison of the count to the ALC threshold value. If the count is less than a fixed percentage of the ALC threshold value then the output of the variable thresholder 126 is zero, indicative of a small field difference. If the count is not less than a fixed percentage of the ALC threshold value then the output of the variable thresholder is one.

The total number of changed pixels between frames depends on, in part, changes in illumination, overall motion, and noise. The use of the ALC threshold value, which is a value dependent on the past history of the count, automatically adjusts for the changes in illumination, overall motion, and noise within a video and between different videos. For example, if the noise increases then the ALC threshold value will likewise increase thereby increasing the count value required to indicate a small field difference. Alternatively, if the noise decreases then the ALC threshold value will likewise decrease thereby decreasing the count value required to indicate a small field difference. Accordingly, the ALC threshold value will automatically adjust in the presence of noise. Moreover, setting the ALC threshold value to zero at scene changes avoids erroneous outputs from the variable thresholder 126 as a result of the scene change.

A sequence of 0's and 1's from the variable thresholder 126 indicates the changes between the fields being compared. For a 3:2 based video a pattern will result from the variable thresholder 126 of 0,1,1,1,1,0,1,1,1,1,0,1,1,1, 1,0 . . . , where 0 represents no motion between the fields being compared and 1 represents motion between the fields being compared. It is to be noted that if the movie has no motion then the pattern will be 0,0,0,0,0,0,0,0 . . . .

Once a decision has been made that a video field may have originated from a movie, indicated by a small frame difference (value of 0 from variable thresholder 126), the sequence analyzer 128 checks for a minimum number of such small frame differences. The sequence analyzer 128 checks every 5th field for a small field difference indicated by a value of 0 from the variable thresholder 126. If a small field difference is determined then a repeat count is incremented by one. The intermediate values from the variable thresholder 126 are ignored, if desired. A series of five or more small values at the proper interval indicates that the video is in 3:2 pull down format. The repeat count will have a value of five or more. A failure to identify a small field difference resets the repeat count to zero.

In addition the sequence analyzer 128 skips a series of fields when the variable thresholder 126 identifies a scene change so that the variable thresholder 126 may obtain sufficient fields to obtain a suitable ALC threshold value.

In an alternative embodiment of the present invention the variable thresholder 126 may be used in conjunction with a summation circuit that sums the magnitudes of the pixel difference values, as described in the background herein.

The result of the current system is that video may be identified as being in a 3:2 pull down format and the synchronization of the 3:2 pull down format is simultaneously obtained for proper subsequent processing by the video system.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A detector for a video signal, comprising:
   (a) a pixel comparator compares a plurality of values of pixels of a first field of said video signal with corresponding pixels of a second field of said video signal where said second field is a second preceding field of said video signal in relation to said first field, thereby obtaining a set of pixel difference values;
   (b) a counter determines a count representative of the number of said set of pixel difference values that are one of greater than a threshold value and less than said threshold value; and
   (c) a sequence analyzer determines whether said count follows a recognizable pattern.

2. The detector of claim 1 wherein said count is the number of said set of pixel difference values greater than said threshold value.

3. The detector of claim 1 wherein said comparing said values of pixels of said first field with said values of said corresponding pixels of said second field is subtraction.

4. The detector of claim 1 wherein said threshold value is a predetermined value.

5. The detector of claim 4 wherein said count is representative of the number of said set of pixel difference values that are greater than said threshold value.

6. The detector of claim 1 further comprising:
   (a) a variable thresholder for determining one of (1) said count is less than a variable statistical value based upon a preceding series of said counts and (2) said count is greater than said variable statistical value based upon said preceding series of said counts; and
   (b) said sequence analyzer determines whether said determination of said variable thresholder follows said recognizable pattern.

7. The detector of claim 6 wherein said variable statistical value is an average of said preceding series of said counts.

8. The detector of claim 7 wherein said variable thresholder determines whether said count is less than a predetermined percentage of said average.

9. The detector of claim 8 wherein said predetermined percentage is 50 percent.

10. The detector of claim 6 wherein said determination of said variable thresholder is an output value indicative of either (1) a small difference between said pixels of said first field and said corresponding pixels of said second field, and (2) a large difference between said pixels of said first field and said corresponding pixels of said second field, said recognizable pattern is a series of said small differences each of which is spaced apart by a series of four output values.

11. The detector of claim 10 wherein said series of said four output values is a series of four said large differences.

12. A detector for a video signal, comprising:
   (a) a pixel comparator compares values of pixels of a first field of said video signal with values of corresponding pixels of a second field of said video signal where said second field is a second preceding field of said video signal in relation to said first field, thereby obtaining a set of pixel difference values;
   (b) a counter determines a current total value representative of one of (1) the number of said set of pixel difference values that are greater than a threshold value, (2) the number of said set of pixel difference values that are less than said threshold value, and (3) the summation of a plurality of said set of pixel difference values;
   (c) a thresholder circuit that determines a variable statistical value based upon a preceding series of said total values;
   (d) said thresholder circuit compares said variable statistical value with said current total value to determine one of (1) whether said variable statistical value is greater than said current total value and (2) whether said statistical value is less than said current total value; and
   (e) a sequence analyzer determines whether the result of said thresholder circuit follows a recognizable pattern.

13. The detector of claim 12 wherein said current total value is the number of said set of pixel difference values greater than said threshold value.

14. The detector of claim 13 wherein said variable statistical value is an average of a preceding series of said current total values.

15. The detector of claim 14 wherein said thresholder circuit determines whether said current total value is less than a predetermined percentage of said average.

16. The detector of claim 15 wherein said determination of said thresholder circuit is an output value indicative of either (1) a small difference between said pixels of said first field and said corresponding pixels of said second field, and (2) a large difference between said pixels of said first field and said corresponding pixels of said second field, said recognizable pattern is a series of said small differences each of which is spaced apart by a series of four output values.

17. The detector of claim 16 wherein said series of said four output values is a series of four said large differences.

18. A method of detecting the format of a video signal comprising the steps of:
   (a) receiving a first pixel value from a pixel of a current field of said video signal;
   (b) receiving a second pixel value from the corresponding pixel of a second preceding field of said video signal;
   (c) calculating the difference between said first and second pixel values to obtain a pixel difference value;
   (d) repeating steps (a), (b), and (c) for a plurality of pixels of said current field and said second preceding field;
   (e) determining a count representative of the number of said pixel difference values obtained as a result of step (d) that are one of (1) greater than a threshold value and (2) less than said threshold value;

(f) repeating steps (a) through (e) to obtain a series of said counts; and (g) analyzing whether said series of said counts follows a recognizable pattern.

19. The method of claim 18 wherein said analyzing step further determines whether said series of said counts has a pattern corresponding to a scene having no motion.

20. The method of claim 18 wherein said analyzing step further determines whether said series of said counts has a pattern corresponding to a 3:2 pull down format.

21. The method of claim 18 wherein said pattern is a plurality of sets of a series of four large values and one small value.

22. The method of claim 18 wherein said pattern has a pattern of a series of counts that are indicative of a small difference between said pixels of said current field and said second preceding field where each of said small differences is spaced apart by a series of four counts.

23. The method of claim 22 wherein said series of said four counts are indicative of a large difference between said pixels of said current field and said second preceding field.

24. The method of claim 18 further comprising the steps of:

(a) calculating a statistical value based upon a preceding series of said counts;

(b) comparing said statistical value with said count to determine one of (1) whether said statistical value is greater than said count and (2) whether said statistical value is less than said count; and (c) determining whether the reset of said comparing of step (b) follows said recognizable pattern.

25. The method of claim 24 wherein said statistical value is an average of said preceding series of said counts.

26. The method of claim 25 wherein said comparing said statistical value with said count determines whether said statistical value is less than a predetermined percentage of said count.

27. The method of claim 24, further comprising the step of setting said statistical value to zero when said count exceeds a percentage of said plurality of pixels.

28. The method of claim 27 wherein said percentage of said plurality of pixels is 50 percent.

29. The method of claim 27, further comprising the step of skipping a plurality of said counts when said analyzing for said recognizable pattern in response to said setting said statistical value to said zero.

30. A method of detecting the format of a video signal comprising the steps of:

(a) receiving a first pixel value from a pixel of a current field of said video signal;

(b) receiving a second pixel value from the corresponding pixel of a second preceding field of said video signal;

(c) calculating the difference between said first and second pixel values to obtain a pixel difference value;

(d) repeating steps (a), (b), and (c) for a plurality of pixels of said current field and said second preceding field;

(e) determining a current total value representative of one of (1) the number of a set of pixel difference values that are greater than a threshold value, (2) the number of said set of pixel difference values that are less than said threshold value, (3) the summation of said set of pixel difference values;

(f) repeating steps (a) through (e) to obtain a series of said total values;

(g) calculating a variable statistical value based upon a preceding series of said total values;

(h) comparing said variable statistical value with said current total value to determine one of (1) whether said variable statistical value is greater than said current total value and (2) whether said variable statistical value is less than said current total value; and (i) analyzing the results of said comparing of step (h) for said series of said total values to identify a recognizable pattern.

31. The method of claim 30 wherein said analyzing step further determines whether said series of said total values has a pattern corresponding to a scene having no motion.

32. The method of claim 30 wherein said analyzing step further determines a pattern corresponding to a 3:2 pull down format.

* * * * *